United States Patent Office 2,783,201
Patented Feb. 26, 1957

2,783,201

PROCESS OF PREPARING A DRY COMPOSITION CONTAINING AN ALKALI METAL HYDROXIDE AND A TANNIN CONTAINING MATERIAL

Henry W. Rahn, Corpus Christi, Tex., assignor to Columbia-Southern Chemical Corporation, Allegheny County, Pa., a corporation of Delaware No Drawing. Application July 27, 1953,
Serial No. 370,607

6 Claims. (Cl. 252—8.5)

This invention relates to a method of preparing a composition suitable for use in the treatment of oil well drilling fluid and for other purposes. Prior to the present invention, it has been known that caustic soda and a tannin or humic acid containing material may be added to oil well drilling fluids for adjustment of the viscosity thereof. For certain purposes, it is advantageous to provide for such use, mixtures of the tannin or humic acid containing material with the alkali metal hydroxide. However, when attempts have been made to produce a dry or solid mixture of these materials by mixing solid alkali metal hydroxide with solid tannin or humic acid containing material, the attempts have not been successful. The mixture usually becomes plastic and gummy and may ultimately harden to a hard, agglomerated mass. In either case, the product is difficult to handle.

According to the present invention, it has been found that a dry pulverulent mixture may be prepared readily by heating the tannin or humic acid containing material, heated usually above 95–100° C. until it has been largely dried, producing a product in which the water content is below about 8 percent by weight, and mixing the thus dried product with solid alkali metal hydroxide, such as sodium hydroxide, which contains less than about 20 percent by weight of water, before the dried product is allowed to pick up appreciable water. Thus, it has been found that by following this procedure, little or no heat is evolved during the mixing and the product obtained is a finely divided, well-incorporated mixture of the components. Little or no fusing of the mass into a plastic or gummy mixture is observed.

Typical materials which contain tannin and/or humic acid and which may be used according to the present invention include the following: tannin extracts such as querbracho, cutch, divi-divi, fustic, gambier, hemlock, logwood, oak, myrobalan, osage orange, sumac, wattle, and mangrove extracts. In addition, the barks which contain 10 percent or more of tannin, such as wattle bark, mangrove bark, redwood bark, chestnut bark, oak bark, hemlock bark, spruce bark, and the like also may be used. Moreover, seed pods, oak and other galls, pecan shells and like fibrous materials which contain 10 percent or more of tannin, may be used. Furthermore, carboniferous minerals which contain 10 percent or more of humic acid, preferably 30 to 50 percent of humic acid, may be used. Typical of such materials are the naturally occurring lignite materials.

The amount of alkali metal hydroxide used should be at least sufficient to react with the tannin and/or humic acid containing product and thereby to produce a mixture which, when dissolved in water, will form a solution having a pH above 7. When barks are used as the source of tannin, the alkali metal hydroxide usually ranges from about 1 to 5 parts of bark per part of alkali metal hydroxide. However, smaller amounts of alkali metal hydroxide can be used although rarely less than one part of alkali metal hydroxide per 12 parts of bark. Moreover, more alkali metal hydroxide can be used although it is rare that the amount of alkali metal hydroxide will exceed 2 to 4 parts by weight of sodium hydroxide or its equivalent per part by weight of bark.

When quebracho extract is used, the amount of alkali metal hydroxide normally is in excess of about 0.15 part (usually 0.3 part or more) per part by weight of quebracho. It is rare to use more than about 3 parts by weight of caustic per part by weight of extract. The same applies to other tannin extracts.

When a carboniferous mineral is used, the amount of alkali metal hydroxide normally is about 0.1 to 3 parts by weight of sodium hydroxide per part of mineral.

Solid inert diluents also may be incorporated in order to prevent or minimize the tendency of the product to cake upon standing. Calcium carbonate has been found to be an especially effective diluent for this purpose. Other typical materials which are suitable includes calcium hydroxide, barium carbonate, magnesium carbonate, and other alkaline earth carbonates or hydroxides, metal oxides and like oxides, including zinc oxides, silica, titanium dioxide, magnesium oxide, calcium oxide, silicates such as precipitated magnesium silicate or calcium silicate, kaolin, montmorillonite, fuller's earth, gas black, and the like.

In the preparation of the product, the quebracho or like material is heated to a temperature to drive off the water. This heating is continued until little or no further water is driven off. Quebracho, as it is normally acquired, contains about 10–20 percent water. Upon heating to a temperature above about 100° C., for example 120° C. or above, the water content of the quebracho falls below about 5 percent, more usually around about 2 percent (as determined by heating to constant weight). Similarly, other tannin and/or humic acid containing material may be dried under the same conditions, that is, a temperature usually above 95° C. which is sufficient to drive off such water as may boil off at the normal boiling point of water.

The alkali metal hydroxide, such as sodium or potassium hydroxide, which is used may be anhydrous. However, it is not necessary that it be completely anhydrous so long as it contain in excess of about 80 percent by weight of alkali metal hydroxide. The usual solid sodium hydroxide compositions manufactured which contain 90 to 98 percent NaOH may be used for this purpose.

In preparing the compositions, the alkali metal hydroxide and the tannin are mixed together with or without the diluent. This mixing is effected dry in any convenient mixing equipment. After the product has been thoroughly mixed, it may be bagged in suitable bags, preferably ones which have a vapor barrier in the walls thereof. For example, paper bags lined with polyethylene may be used to store these products.

The products herein contemplated may be used, as explained above, for the adjustment of the viscosity of oil well drilling fluids. They also may be used for other purposes, including the improvement of cement mixtures, boiler compounds, and the like.

The following example is illustrative:

Example 1

One hundred parts quebracho extract containing 17 percent moisture is heated at 120° C. until the weight remains substantially constant. Thereupon, this material is mixed with 100 parts solid powdered sodium hydroxide containing approximately about 2 percent by weight of water. Also, 50 parts precipitated $CaCO_3$ are added. The three components are mixed together in a rotary mixer.

Other typical compositions may be prepared by mixing the components in the following proportions:

(a) Four parts of ground mangrove bark containing 17 percent water are heated to approximately 120° C. until a constant weight is obtained. The dried ground bark is then mixed with 1 part of powdered solid sodium hydroxide containing about 2 percent by weight of water, by tumbling the components in a rotary mixer.

(b) Four parts of ground lignite shale containing 34 percent water are heated to about 120° C. until constant weight is obtained. The dried ground lignite shale is added to 1 part of flake solid sodium hydroxide containing about 2 percent by weight of water. The two components are dispersed by mixing in a rotary mixer.

Although the present invention has been described with reference to the specific details of certain embodiments thereof, it is not intended that such details shall be regarded as limitations upon the scope of the invention except insofar as included in the accompanying claims.

What is claimed:

1. A method of preparing a composition which comprises heating a naturally occurring material which contains at least 10 percent by weight of an acid of the group consisting of tannic acid and humic acid until the water content is below about 8 percent by weight and mixing the dried product with sodium hydroxide which contains less than 20 percent by weight of water before the heated tannin-containing material can absorb substantial moisture, the proportion of sodium hydroxide to said dried material being substantially 0.1 to 3 parts of sodium hydroxide per part of said material.

2. A method of preparing a composition which comprises heating a naturally occurring material which contains at least 10 percent by weight of an acid of the group consisting of tannic and humic acids at a temperature of at least about 100° C. until substantially no further water is driven off, and mixing the dried product with sodium hydroxide which contains less than 20 percent by weight of water before the heated material can absorb substantial moisture, the amount of said sodium hydroxide being at least sufficient to provide a mixture which, when dissolved in water, will form a solution having a pH above 7.

3. A method of preparing a composition which comprises heating a naturally occurring material which contains at least 10 percent by weight of an acid of the group consisting of tannic and humic acids at a temperature of at least about 100° C. until substantially no further water is driven off, and mixing the dried product with alkali metal hydroxide which contains less than 20 percent by weight of water before the heated material can absorb substantial moisture, the amount of said alkali metal hydroxide being at least sufficient to provide a mixture which, when dissolved in water, will form a solution having a pH above 7.

4. The process of claim 2 wherein the material subjected to heat is a bark which contains 10 percent or more of tannin and the amount of sodium hydroxide ranges from 0.25 to 5 parts of bark per part of sodium hydroxide.

5. The process of claim 1 wherein the tannin-containing material is quebracho extract.

6. A method of preparing a composition which comprises heating a naturally occurring material which contains at least 10 percent by weight of an acid of the group consisting of tannic and humic acids until the water content is below about 8 percent by weight, and mixing the dried product with sodium hydroxide which contains less than 20 percent by weight of water before the heated material can absorb substantial moisture, the amount of said sodium hydroxide being at least sufficient to provide a mixture which, when dissolved in water, will form a solution having a pH above 7.

References Cited in the file of this patent
UNITED STATES PATENTS 2,560,930     Campise                July 17, 1951